UNITED STATES PATENT OFFICE.

WALTER VOIGTLAENDER-TETZNER, OF LUDWIGSHAFEN-ON-THE-RHINE, GERMANY, ASSIGNOR TO BADISCHE ANILIN AND SODA FABRIK, OF LUDWIGSHAFEN - ON - THE - RHINE, GERMANY, A CORPORATION OF GERMANY.

AZO DYE AND PROCESS OF MAKING SAME.

SPECIFICATION forming part of Letters Patent No. 718,032, dated January 6, 1903.

Application filed March 4, 1902. Serial No. 96,696. (No specimens.)

*To all whom it may concern:*

Be it known that I, WALTER VOIGTLAENDER-TETZNER, doctor of philosophy and chemist, a subject of the King of Saxony, residing at Ludwigshafen-on-the-Rhine, in the Kingdom of Bavaria, Germany, have invented new and useful Improvements in a new Azo Coloring-Matter and Process of Making Same, of which the following is a specification.

This invention relates to new mordant dyeing acid azo coloring-matters and process of making them. These coloring-matters can be distinguished from all hitherto known acid azo coloring-matters by yielding meta-phenylene-diamin and para-amido salicylic acid when suitably reduced with zinc-dust and caustic-soda solution and an amido derivative of a hereinafter-defined naphthalene sulfo-acid on suitable treatment with stannous chlorid and hydrochloric acid. The meta-amido-benzene-azo salicylic acid which is employed in the process of producing these new coloring-matters may be prepared by acting on meta-nitro-benzene-azo salicylic acid with a suitable reducing agent, such as sodium sulfid, or by acting on acetyl-meta-amido-benzene-azo salicylic acid with a suitable saponifying agent, such as caustic-soda lye.

The process of obtaining the new coloring-matters is illustrated by the following examples, but the invention is not confined to the proportions and other conditions therein set forth. The parts are by weight.

Example 1: Dissolve twenty-five and nine-tenths (25.9) parts of meta-amido-benzene-azo salicylic acid in seven hundered (700) parts of hot water and eleven and five-tenths (11.5) parts of caustic-soda solution containing thirty-five (35) per cent. of caustic soda, (NaOH,) cool and lower the temperature to five (5°) degrees centigrade, and then add seven (7) parts of sodium nitrite dissolved in the necessary quantity of water. Pour this mixture while stirring into thirty-five (35) parts of hydrochloric acid containing thirty-two (32) per cent. of that acid (HCl) and to which sufficient ice and ice-water have been added. After having stirred this mixture for fifteen (15) minutes pour it into a solution of twenty-five (25) parts of 1-naphthol-4-sulfo-acid and forty (40) parts of calcined carbonate of soda and eight hundred (800) parts of water, stir for twelve (12) hours, then raise the temperature to one hundred (100°) degrees centigrade, precipitate the coloring-matter by means of common salt, filter while warm, then press and dry. In place of the 1-naphthol-4-sulfo-acid there may be employed an equivalent quantity of the 1-naphthol-3.6-disulfo-acid, when a coloring-matter of similar properties will be obtained.

Example 2: The diazo compound obtained from twenty-five and nine-tenths (25.9) parts of meta-amido-benzene-azo salicylic acid prepared according to the method given in Example 1 is poured into a solution of twenty-four (24) parts of 2-amido-8-naphthol-6-sulfo-acid and sixty (60) parts of crystallized sodium acetate in eight hundred (800) parts of water, stir for twelve (12) hours, then raise the temperature to ninety (90°) degrees centigrade, render the mixture alkaline to litmus-paper by means of carbonate-of-soda solution, precipitate the coloring-matter by means of common salt, filter while warm, press, and dry.

The coloring-matters so prepared have the following properties: In powder form they are of a red-brown color. They are soluble in water, giving a red solution, which solution becomes brownish on addition of caustic soda. The concentrated aqueous solution gives a red precipitate on addition of hydrochloric acid. When mixed with concentrated sulfuric acid, these coloring-matters produce a color which is within the range of from red to orange-brown and which mixture on dilution with ice-water yields a precipitate whose color is within the range of from red to orange-brown. On reduction with zinc-dust and caustic-soda solution meta-phenylene-diamin can be extracted from the filtered reduction liquor by means of ether, and the so-extracted aqueous liquor on careful addition of hydrochloric acid yields para-amido salicylic acid. On treating the coloring-matters with stannous chlorid and hydrochloric acid the amido derivative of the component combined with the diazotized meta-amido-benzene-azo salicylic acid can be obtained from the so-resulting liquor.

These coloring-matters dye wool a shade which lies within the range of from red to brown, which shades on treatment with bichromate of potash become browner. The shades directly produced are of an exceptional fastness to light and fulling.

For the purposes of this invention 1-naphthol-4-sulfo-acid, 1-naphthol-3.6-disulfo-acid, and 2-amido-8-naphthol-6-sulfo-acid when suitably combined with the diazotized meta-amido-benzene-azo salicylic acid are equivalents of each other and are hereinafter included in the generic term "naphthalene sulfo-acid."

What is claimed is—

1. Process for the production of azo coloring-matters which consists in suitably combining diazotized meta-amido-benzene-azo salicylic acid with a hereinbefore-defined naphthalene sulfo-acid.

2. Process for the production of azo coloring-matters which consists in combining diazotized meta-amido-benzene-azo salicylic acid with 1-naphthol-4-sulfo-acid in alkaline solution.

3. As a new article of manufacture azo coloring-matter which on suitable treatment with zinc-dust, caustic soda, and hydrochloric acid yields meta-phenylene-diamin and para-amido salicylic acid and on suitable treatment with stannous chlorid and hydrochloric acid yields an amido derivative of a hereinbefore-defined naphthalene sulfo-acid.

4. As a new article of manufacture azo coloring-matter which can be prepared from diazotized meta-amido-benzene-azo salicylic acid and 1-naphthol-4-sulfo-acid, which on suitable treatment with zinc-dust, caustic soda, and hydrochloric acid yields meta-phenylene-diamin and para-amido salicylic acid and on suitable treatment with stannous chlorid and hydrochloric acid yields 2-amido-1-naphthol-4-sulfo-acid.

In testimony whereof I have hereunto set my hand in the presence of two subscribing witnesses.

WALTER VOIGTLAENDER-TETZNER.

Witnesses:
JOHN L. HEINKE,
JACOB ADRIAN.